United States Patent
Choo et al.

(10) Patent No.: US 8,630,449 B2
(45) Date of Patent: Jan. 14, 2014

(54) DEVICE AND METHOD FOR MONITORING WATER LEVEL

(75) Inventors: Yeon Hak Choo, Seoul (KR); Jung Keun Ahn, Goyang-si (KR); Sang Wan Hong, Anyang-si (KR); Young Jin Park, Guri-si (KR); Jae Hyun Shim, Seoul (KR); Sang Man Jeong, Seoul (KR)

(73) Assignees: UDP Technology Ltd. (KR); S1 Corporation (KR); National Disaster Management Institute (KR)

( * ) Notice: Subject to any disclaimer, the term of this patent is extended or adjusted under 35 U.S.C. 154(b) by 154 days.

(21) Appl. No.: 13/370,233

(22) Filed: Feb. 9, 2012

(65) Prior Publication Data
US 2012/0269381 A1    Oct. 25, 2012

(30) Foreign Application Priority Data
Feb. 9, 2011    (KR) .................. 10-2011-0011466

(51) Int. Cl.
*G06K 9/00*    (2006.01)
(52) U.S. Cl.
USPC ............................................... 382/100
(58) Field of Classification Search
None
See application file for complete search history.

(56) References Cited

U.S. PATENT DOCUMENTS

| | | | | |
|---|---|---|---|---|
| 6,098,029 | A * | 8/2000 | Takagi et al. | 702/127 |
| 2005/0271266 | A1* | 12/2005 | Perrier | 382/157 |
| 2012/0051603 | A1* | 3/2012 | Maltby, II | 382/113 |

FOREIGN PATENT DOCUMENTS

KR    10-0661487    12/2006

* cited by examiner

*Primary Examiner* — Claire X Wang
*Assistant Examiner* — Thomas A James
(74) *Attorney, Agent, or Firm* — John K. Park; Park Law Firm

(57) ABSTRACT

The present invention relates to a water level monitoring device and method, which has an advantage of efficient water level monitoring and high device reliability by setting a portion of an area including the water area and the shore area in the image data, monitoring an area in the horizontal direction other than the vertical direction through the image, decreasing complexity by significantly reducing the computational amount over an existing vertical direction water level measuring system, excluding noises such as floating matters, irregular reflection and so on through a water level model generating process for area distinction, and generating a water level model adaptive to environmental factors such as algal bloom, muddy water and so on.

15 Claims, 10 Drawing Sheets

(a)

(b)

DEVICE AND METHOD FOR MONITORING WATER LEVEL

CROSS-REFERENCE TO RELATED APPLICATION

This application claims the benefit of Korean Application No. 10-2011-0011466, filed on Feb. 9, 2011, with the Korean Intellectual Property Office, the disclosure of which is incorporated herein by reference.

BACKGROUND OF THE INVENTION

1. Field of the Invention

The present invention relates generally to a device and method for monitoring a water level, and more particularly, to a device and method for monitoring a water level, which is capable of setting a water area and a shore area (an area excluding the water area) as monitoring areas and monitoring a variation of the monitoring areas through an image analysis.

2. Description of the Related Art

With development of a variety of image equipments, a monitoring system has a wide range of applications to monitoring fields such as monitoring of a particular object by tracking the object through an analysis of an image picked by relevant image equipment or setting a particular basis in the image. Such a monitoring system is becoming increasingly more sophisticated and continues to grow due to a variety of algorithms applied to the image equipments for the image analysis.

An example of fields for which the image equipments are used may include a water level measuring field for measuring or monitoring a water level and informing peoples of a danger based on a result of the measurement or monitoring.

There has been also conventionally used a water level measuring system in which a water level is recognized through detection of an air pressure of a water level sensor if the water level reaches a predetermined value and warning or water level measuring is performed based on the recognition.

However, such a water level measuring system using the water level sensor has a problem of low accuracy due to deviation of the sensor by a flow of water and contamination of the sensor by water.

In addition, there has been also proposed a water level measuring system using an ultrasonic wave or a laser, which has a problem of low accuracy due to increase in a sensor error which may occur when a water surface is irregularly changed or water temperature is varied.

Accordingly, in order to overcome these problems, there has been recently proposed a water level measuring system using image equipments as shown in FIG. 1, which uses a camera 10 to acquire an image for an area occupied by water W in a vertical direction, calculates the number of pixels in a vertical direction X from a boundary B up to the screen lowest point on a still image, and calculates an actual water level based on the calculated number of pixels and preset reference information, thereby overcoming problems due to mechanical malfunction of existing sensors.

However, such a water level measuring system employs an algorithm to calculate the number of pixels in the vertical direction and measure a height based on a preset operation expression, which has a problem in that it is difficult to detect the correct number of pixels as a water surface is irregularly moved due to external environmental factors (wind, movement of particular objects, and so on), and an error of a finally calculated water level increases with increase in an error of the number of pixels.

For example, if a water level instantaneously rises at a particular portion due to an external environmental factor such as wind, measurement including all of corresponding pixel heights is made and thus the water level is measured to be instantaneously higher. Accordingly, a warning system associated with the water level measuring system may make malfunction such as raising an alarm even though the actual water level is not high.

In addition, the calculation of all pixels from the boundary up to the screen lowest point may lead to increase in computation and system complexity, which results in inefficiency of a system for monitoring a water level based on a boundary to a certain water level.

In addition, the above-mentioned water level measuring system has also other problems in that a measurement error occurs due to a change in water surface color by external environmental factors (muddy water, algal bloom and the like), particularly a severe water level measurement error due to difficulty in boundary detection due to the change in water surface color.

SUMMARY OF THE INVENTION

Accordingly, it is an object of the present invention to provide a device which is capable of performing efficient water level monitoring operation by monitoring a water area in a horizontal direction other than a vertical direction through an image, distinguishing the water area from other areas, and detecting a change in water level through monitoring on a change in the areas.

It is another object of the present invention to provide a water level monitoring device which is capable of increasing device reliability by complexly determining whether or not a water level reaches a predetermined reference value through an algorithm more effective than water level measurement to detect intrusion of a water area on a reference line provided in an image.

It is another object of the present invention to provide a water level monitoring device which is capable of detecting boundary line movement of a water area easily using a statistical method to distinguish a boundary line between water propagating in a horizontal direction and a shore, and additionally providing various levels of water alarms based on matching levels preset depending on the boundary line movement.

It is another object of the present invention to provide a water level monitoring device which is capable of easily detecting changes such as instantaneous water level exceeding, a change in water color and so on due to external environmental factors to increase measurement accuracy, thereby providing high device reliability.

To achieve the above objects, according to an aspect of the invention, there is provided a water level monitoring device which acquires image data including a monitoring area set to include a shore area and a water area and monitors a change in water level for the monitoring area, including: a receiving unit which receives the image data from an external device; an output unit which outputs a warning signal; a storage unit which stores a water level model with distinction between the water area and the shore area as similar characteristic areas; and a controller which sets at least one monitoring area, generates the water level model for the monitoring area in the image data received from the receiving unit, updates the water level model stored in the storage unit or accumulates the water level model in the storage unit, monitors a water level based on a change in the shore area and the water area of the water level model, and outputs a warning signal through the output unit.

If a plurality of monitoring areas is preset, the controller may generate water level models for the plurality of monitoring areas, and, if it is detected that a variation in pixels exceeds a reference value preset for one of the water level models, determine whether or not a variation in pixels for another water level model exceeds a preset reference value, and determines whether or not to output a warning signal.

The controller may generate a water level model with distinction between the shore area and the water area by setting representative areas for the water area and the shore area, respectively, calculating a mean representative value for each of the representative areas, and grouping pixels having values falling within a preset approximation range of the mean representative value.

The controller may generate the water level model with distinction between the shore area and the water area as similar characteristic areas through a Gaussian modeling.

The controller may generate the water level model with distinction between the shore area and the water area by detecting a boundary line between the water area and the shore area.

The controller may compare the existing water level model stored in the storage unit with the water level model generated based on the image data received from the receiving unit, and monitor a change in water level based on a variation in pixels calculated for one of the shore area and the water area.

The controller may output a warning signal through the output unit if the variation in pixels exceeds a preset reference value or a temporally accumulated variation in pixels for a preset range of time exceeds a preset reference value.

The controller may output no warning signal through the output unit if the variation in pixels exceeds a preset reference value and the temporally accumulated variation in pixels for a preset range of time is less than a preset reference value.

At least one reference line may be set in the monitoring area, and the controller may monitor whether or not one of the water area and the shore area in the water level model intrudes on the reference line, and output a warning signal through the output unit.

The storage unit may store a matching table in which water level values match the at least one reference line, and the controller may calculate a water level value through monitoring whether or not the reference line is intruded based on the matching table, and output a warning signal through the output unit.

If a plurality of monitoring areas is preset, the controller may generate water level models for the plurality of monitoring areas, and, if it is detected that a variation in pixels exceeds a reference value preset for one of the water level models, determine whether or not a variation in pixels for another water level model exceeds a preset reference value, and determine whether or not to output a warning signal, and if a plurality of monitoring areas and reference lines for the plurality of monitoring areas are set and if one of the water area and the shore area intrudes on a reference line set in one of the water level models, the controller may determine whether or not a reference line set in another water level model is intruded, and determine whether or not to output a warning signal.

To achieve the above objects, according to another aspect of the invention, there is provided a water level monitoring method of a water level monitoring device which monitors a change in water level for a monitoring area including a shore area and a water area, including: a first step of acquiring image data including the monitoring area from an external device; a second step of generating a water level model by dividing an area corresponding to the monitoring area into the water area and the shore area as similar characteristic areas from the image data; and a third step of monitoring a water level through comparison between the generated water level model and an existing water level model stored in a memory, outputting a warning signal through an output unit, and updating the existing water level model stored in the memory with the generated water level model or accumulating the generated water level model in the memory, The second step may include generating a water level model with distinction between the shore area and the water area by setting representative areas for the water area and the shore area, respectively, calculating a mean representative value for each of the representative areas, and grouping associated pixels, or through a Gaussian modeling.

The third step may include comparing the existing water level model with the generated water level model, monitoring a change in water level based on a variation in pixels calculated for one of the shore area and the water area, and outputting a warning signal through the output unit if the variation in pixels exceeds a preset reference value or a temporally accumulated variation in pixels for a preset range of time exceeds a preset reference value.

The third step may further include outputting no warning signal through the output unit if the variation in pixels exceeds a preset reference value and the temporally accumulated variation in pixels for a preset range of time is less than a preset reference value.

At least one reference line may be set in the monitoring area, and the third step may include monitoring whether or not one of the water area and the shore area in the water level model intrudes on the reference line, and outputting a warning signal through the output unit.

The present invention has an advantage of efficient water level monitoring and high device reliability by setting a portion of an area including the water area and the shore area in the image data, monitoring an area in the horizontal direction other than the vertical direction through the image, decreasing complexity by significantly reducing the computational amount over an existing vertical direction water level measuring system, excluding noises such as floating matters, irregular reflection and so on through a water level model generating process for area distinction, and generating a water level model adaptive to environmental factors such as algal bloom, muddy water and so on.

In addition, the present invention has another advantage of further decrease in complexity by detecting a variation in pixels for one of the water area and the shore area in the monitoring area, and correct water level monitoring by easily detecting a boundary line between the water area and the shore area.

In addition, the present invention has another advantage of easy water level measurement by setting a reference line intruded along boundary line movement and a matching water level.

In addition, the present invention has another advantage of increased measurement accuracy and high device reliability by easily detecting changes such as instantaneous water level exceeding, a change in water color and so on due to external environmental factors and providing a process of excluding noises due to external environmental factors.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENT

In order to overcome a problem of the existing vertical direction water level measuring system that requires a complicated algorithm to measure a height from the ground to a water surface in a vertical direction and has a frequent error due to noises vulnerable to external environmental factors, the present invention provides a water level monitoring device which is capable of improving device efficiency over the existing vertical direction water level measuring system and performing correct water level monitoring adaptive to external environmental factors by setting a monitoring area in which a water area and a shore area (area except the water area) coexist in a horizontal direction and monitoring a change in water level due to a change in the water area and the shore area along a horizontal line or a set curve.

Figure 1:
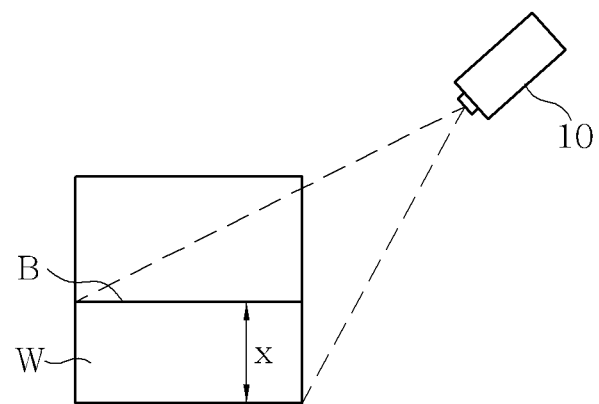
FIG. 1 is a view showing a conventional water level measuring device.
Figure 2:
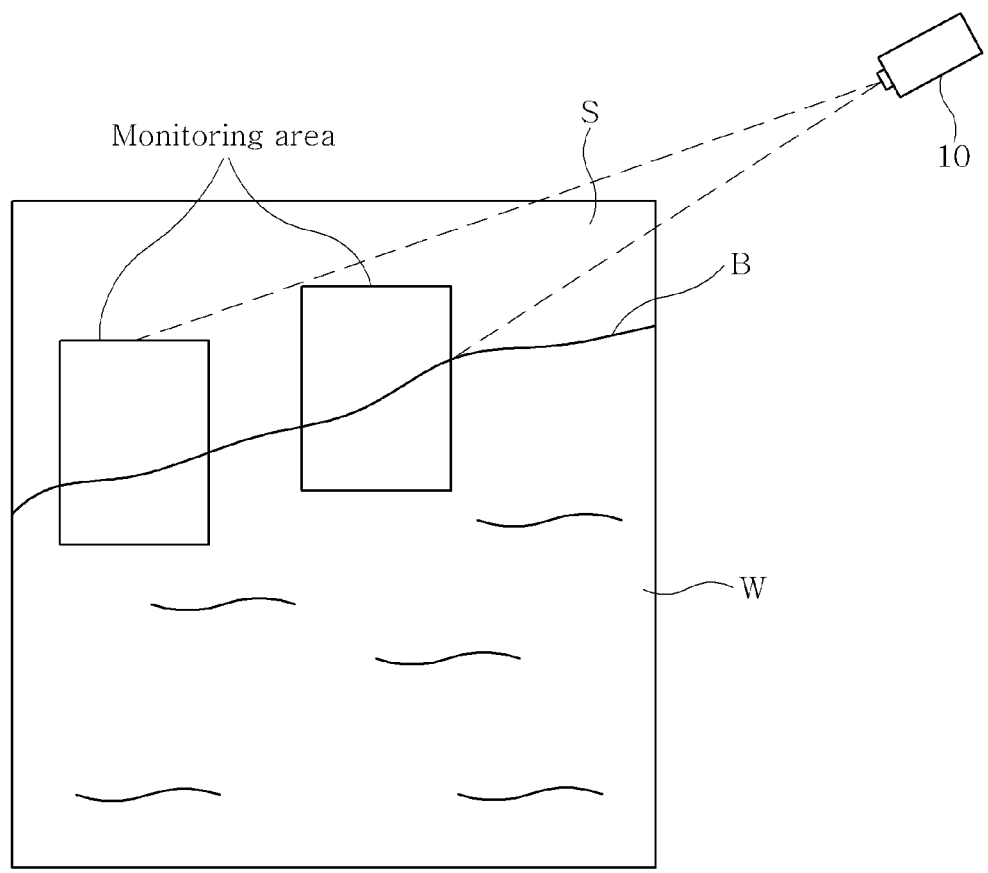
FIG. 2 is a view showing a water level monitoring device according to an embodiment of the present invention.

FIG. 2 is a view showing a water level monitoring device according to an embodiment of the present invention. As shown, a water level model is generated through a filtering process to set a monitoring area with both of a shore area S and a water area W in an image picked through a camera 10 and distinguish between the shore area and the water area in the monitoring area in a place such as a coast, a lake, a bank, a dam, a river or the like where the shore area and the water area coexist.

The generation of the water level model will be described in detail later with reference to FIG. 6.

Thereafter, a change of the water level can be detected through a change of the shore area and the water area from the image acquired in real time through the camera 10.

In this embodiment, examples of the camera may include an infrared camera and an infrared lighting camera.

In addition, a separate boundary line B may be detected using an edge detection method or the like in order to make clearer distinction between the shore area and the water area to cope with a change of various external environments.

In addition, a dangerous water level may be set by setting a separate straight or curved reference line in the monitoring area. If the water area intrudes on the reference line or the boundary line B reaches the reference line, a warning signal can be interlockingly output. In addition, a plurality of reference lines may be provided in the monitoring area, a matching table in which the reference lines match water level values may be provided, and one of the plurality of reference lines whose boundary line is located depending on a change in area or water level may be detected to calculate a water level value.

Figure 3:
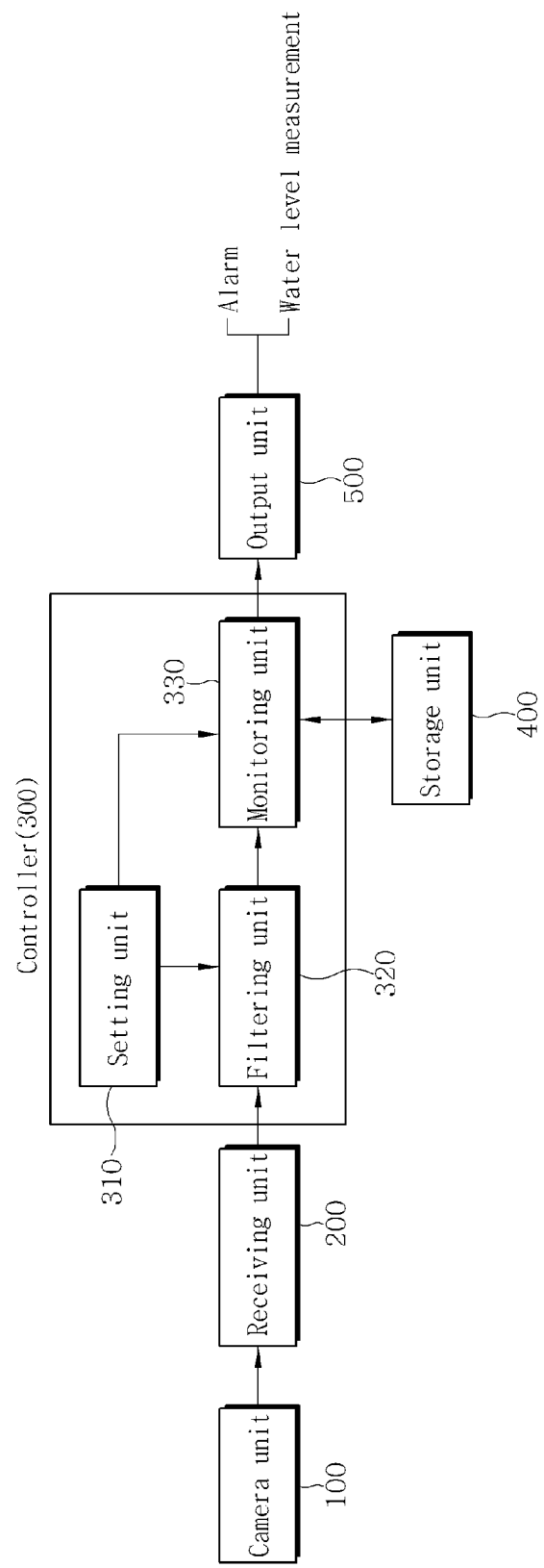
FIG. 3 is a block diagram showing configuration of the water level monitoring device according to the embodiment.

Based on the above description, a water level monitoring device according to an embodiment of the present invention will be described with reference to FIG. 3. Referring to FIG. 3, the water level monitoring device may include a camera unit 100 which acquires an image of a monitoring area, a receiving unit 200 which receives data of the image acquired by the camera unit 100, a storage unit 400 storing a water level model generated by distinction between a shore area and a water area as similar characteristic areas, and a controller 300 which sets at least one monitoring area, generates a water level model based on data corresponding to the monitoring area in the image data received from the receiving unit 200, stores the generated water level model in the storage unit 400 or updates the water level model stored in the storage unit 400, and monitors a water level based on a change in the shore area and the water area of the water level model.

The receiving unit 200 may be connected to other various external devices providing a stream of image data via a network, in addition to the camera unit 100, through which the receiving unit 200 can acquire the stream of image data.

The controller 300 may accumulate a variation calculated through temporal comparison between an existing water level model and the latest water level model in the storage unit 400 in a temporal sequence to generate a temporal statistical model as temporally accumulated variation statistics, and may output a warning signal such as an alarm through an output unit 500 if the variation exceeds a preset reference value or a difference between accumulated variations for a preset range of time set before and after a certain point of time exceeds a preset reference value.

The variation may be a variation in pixels and may be added to or subtracted from an exiting accumulated variation for one of the shore area and the water area. For example, if a variation measurement basis is a variation for the water area, an existing accumulated variation is increased by a calculated variation when the water area is increased at a certain point of time and the existing accumulated variation is decreased by a calculated variation when the water area is decreased, thereby calculating a final accumulated variation for the water area at the point of time.

That is, the variation in pixels may be accumulatively stored in the storage unit 400 in a temporal sequence, in which case the variation generated by a difference in area with the existing water level model may have negative and positive values and may be added to or subtracted from the existing accumulated variation. In this manner, computational complexity can be reduced by calculating the variation in pixels.

In this embodiment, the existing water level model compared with the latest water level model may be a water level model having the smallest difference in generation time with the latest water level model.

The controller 300 may also set at least one reference line for the monitoring area, determine based on a change in the shore area and the water area whether or not the reference line is intruded. If it is determined that the reference line is intruded, a warning signal such as an alarm may be output through the output unit 500.

A setting unit 310 may set a plurality of reference lines and the storage unit 400 may store a matching table in which the reference lines match corresponding water level values.

Thus, if the water area intrudes on one of the plurality of reference lines, the controller 300 may calculate a water level value by comparing the intruded reference line with the matching table and output the calculated water level value through the output unit 500.

The controller 300 may include the setting unit 310 which sets the monitoring area and the reference lines, a filtering unit 320 which generates the water level model, and a monitoring unit 330 which monitors a change in water level through comparison between the water level model provided by the filtering unit 320 and the existing water level model stored in the storage unit 400 and accumulates the water level model provided by the filtering unit 320 in the storage unit 400 in a temporal sequence or updates the existing water level model stored in the storage unit 400 with the water level model provided by the filtering unit 320.

Figure 4:
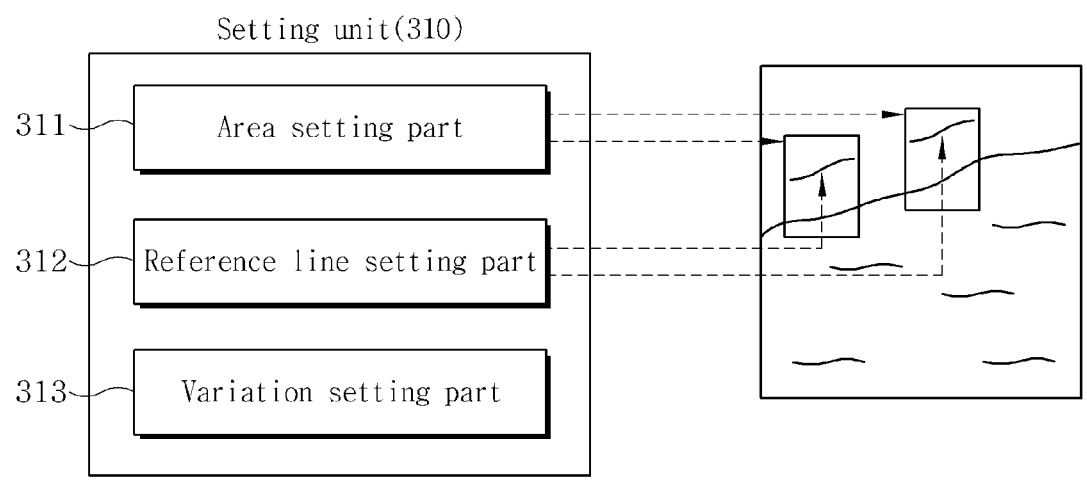
FIG. 4 is a view showing a setting configuration of the water level monitoring device according to the embodiment.

In this embodiment, as shown in FIG. 4, the setting unit 310 may include an area setting part 311 which sets the monitoring area, a reference line setting part 312 which sets the reference line, and a variation setting part 313 which sets a reference value for variation in pixels.

The area setting part 311 may set a plurality of monitoring areas and the filtering unit 320 may generate a plurality of water level models corresponding respectively to the plurality of monitoring areas.

In addition, the variation setting part 313 may set a reference value for at least one of the number of pixels and the time-per-number of pixels. If a variation in one of the water area and the shore area between the latest water level model and the existing water level model or a difference between accumulated variations for a preset range of time set before and after a certain point of time exceeds the reference value, the monitoring unit 330 may determine that the water level exceeds a dangerous water level or is suddenly changed, and output a warning signal through the output unit 500.

Moreover, the reference line setting part 312 may also set and store a plurality of reference lines. Based on the plurality of reference lines set in the reference line setting part 312, the monitoring unit 330 may use the matching table to calculate, a water level value, the maximal one of one or more water level values matching one or more reference lines intruded by the water area. That is, if the plurality of reference lines is intruded by the water area, the maximal water level value may be calculated as a proper water level value.

In addition, in the area setting part 311 and the reference line setting part 312, a plurality of reference lines may match a plurality of areas. Then, a plurality of corresponding matching tables may be stored in the storage unit 400. In other words, there exists a plurality of different matching tables which store different water level values in association with the plurality of reference lines set for the plurality of corresponding areas.

Accordingly, the monitoring unit 330 may detect a change in water areas in a plurality of monitoring areas and compare a plurality of water level values calculated from the plurality of matching tables, thereby obtaining a correct water level value and hence improving reliability of the device.

As an alternative, the monitoring unit 330 may determine whether or not all reference lines of the monitoring areas are intruded, through comparison between one reference line set in each area and another, and determine whether or not to output a warning signal through the output unit 500. This can provide high device reliability since intrusion of a reference line in one monitoring area is determined as noise due to external environments such as instantaneous waves or wind, which is excluded.

Figure 5:
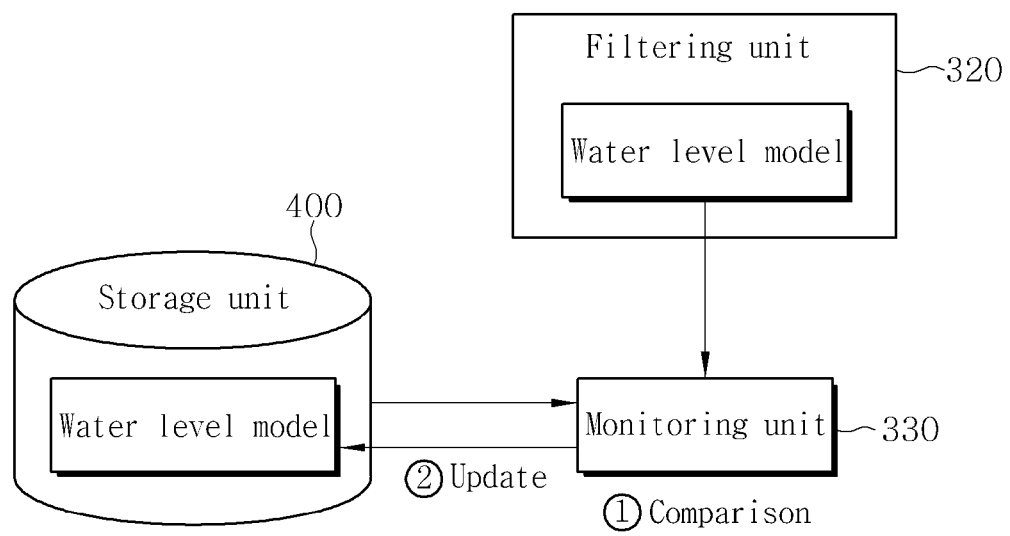
FIG. 5 is a view showing configuration of monitor of water level change through water level model comparison according to the embodiment.

As shown in FIG. 5, the filtering unit 320 generates a water level model through filtering of image data and transmits it to the monitoring unit 330.

As described above, the monitoring unit 330 may monitor a water level through a reference line based on the water level model transmitted from the filtering unit 320 or may monitor a water level based on detection of a variation in a monitoring area through comparison between the water level model transmitted from the filtering unit 320 and the existing water level model stored in the storage unit 400. In addition, the monitoring unit 330 may continue to update the existing water level model stored in the storage unit 400 with the water level model transmitted from the filtering unit 320, or may store the water level model consistently provided by the filtering unit 320 in the storage unit 400 in a temporal accumulative manner, or may accumulate and store the variation in a temporal sequence.

In addition, the monitoring unit 330 calculates the variation through comparison between the water level model received from the filtering unit 320 and the water level model updated in the storage unit 400, accumulates the calculated variation in the storage unit 400 and monitors the water level based on the accumulated variation.

Figure 6:
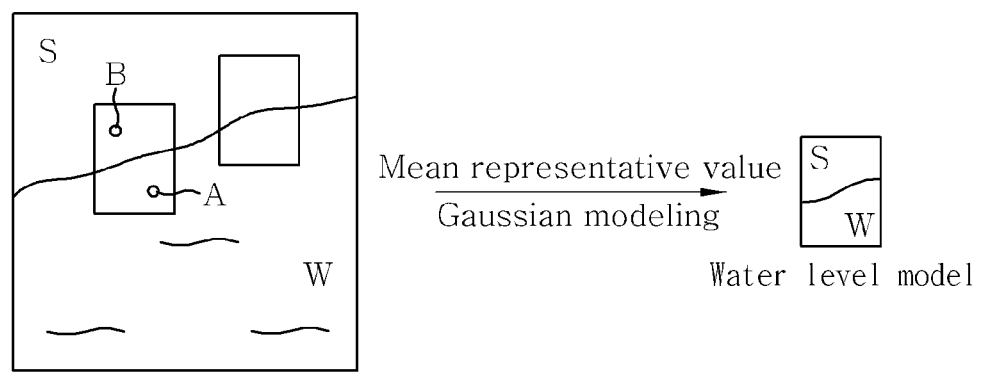
FIG. 6 is a view showing water model generation through filtering of a monitoring area according to the embodiment.

In addition, as shown in FIG. 6, the filtering unit 320 may generate a water level model with distinction between the shore area and the water area by setting representative areas A and B of at least one pixel for the water area and the shore area, respectively, to distinguish between the shore area and the water area, calculating a mean representative value for each of the representative areas, and grouping pixels having values falling within a preset approximation range of the mean representative value.

In addition, the filtering unit 320 may generate a water level model with distinction between the shore area and the water area by obtaining characteristic values of the representative areas for the shore area and the water area using Gaussian modeling or the like and extending and selecting similar characteristic areas.

In this manner, since the area distinction through the mean representative value or the Gaussian modeling allows correct distinction of the water area and the shore area between similar characteristic areas, it is possible to secure characteristics which are not affected by external environment factors such as water color change, floating matters, irregular reflection and so on.

Figure 7:
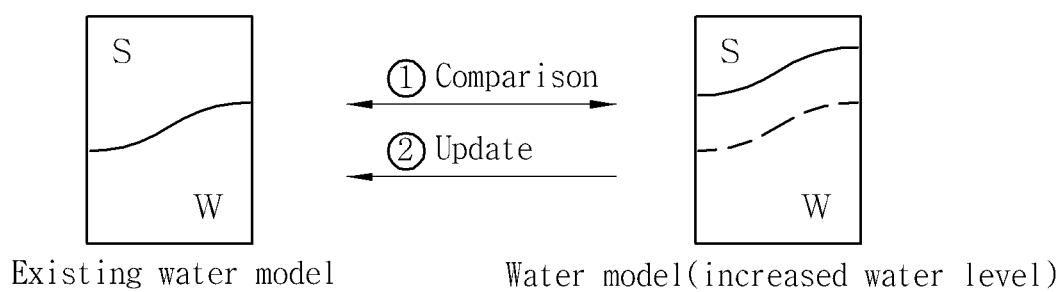
FIG. 7 is a view showing comparison between water level models according to an embodiment of the present invention.
Figure 7:
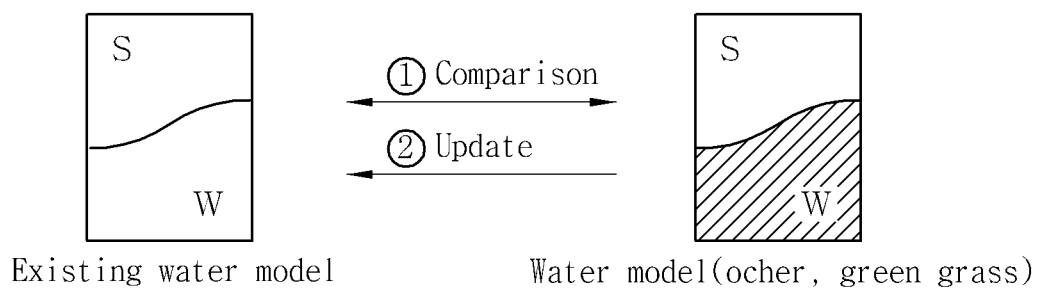

FIG. 7 is a view showing a process of comparing the above-described generated water level model with the existing water level model and updating the existing water level model. First, referring to FIG. 7(a), the monitoring unit 330 may compare the existing water level model stored in the storage unit 400 with the water level model received from the filtering unit 320.

Accordingly, as in the embodiment of FIG. 7(a), if the water moves upward to change a water level in the water level model received from the filtering unit 320 and accordingly there occurs a difference between the received water level model and the existing water level model, the monitoring unit 330 may calculate a difference in variations between the existing water level model stored in the storage unit 400 with the water level model received from the filtering unit 320, accumulate the calculated difference in the storage unit 400 in a temporal sequence, and output a warning signal through the output unit 500 if the accumulated difference or an accumulated difference in variations for a preset range of time exceeds a preset reference value.

FIG. 7(b) shows a color change in the water area due to an external environmental factor (ocher or green grass) other than the change in water level. The filtering unit 320 may easily distinguish between the water area and the shore area through distinction between similar characteristic areas through the mean representative value and the Gaussian modeling even for such a change in external environmental factor.

Accordingly, as in the above description, the monitoring unit 330 may easily detect a color change in the water area due to an external environmental factor and update the existing water level model stored in the storage unit 400 with the water level model from the filtering unit 320, which is reflected with the change due to the external environmental factor, or accumulate the water level model from the filtering unit 320 in the storage unit 400.

In addition, instantaneous abnormality may occur due to an external environmental factor.

Figure 8:
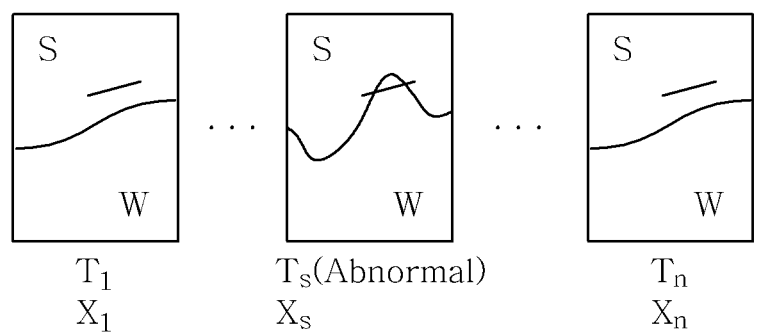
FIG. 8 is a view showing noise removal of a water level model device according to an embodiment of the present invention.

As one example, as shown in FIG. 8, noise may occur such as in a case where a portion of the water area instantaneously intrudes on a reference line due to wind or a variation thereof exceeds a reference value.

Then, the monitoring unit 330 may calculate an accumulated variation difference (Xn-X1) per a difference or range (Tn-T1) between time of the existing water level model and time set before and after the point of time of the water level model in which abnormality occurs. If the accumulated variation difference (Xn-X1) is less than a preset value Y, this may be determined as noise and accordingly a warning signal may not be output through the output unit 500.

Figure 9:
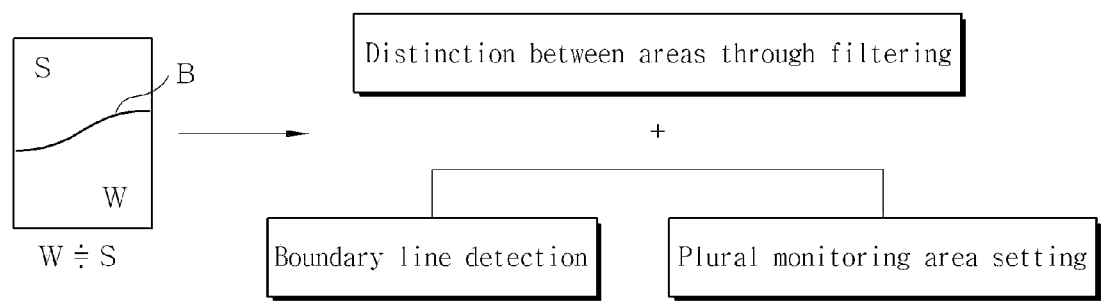
FIG. 9 is a view showing area distinction in water level model generation according to an embodiment of the present invention.

FIG. 9 shows a case where means representative values of the shore area and the water area are similar to each other or it is difficult to achieve area distinction through the Gaussian modeling due to external environmental factors caused in the water level model generating process of the filtering unit 320. In this case, the filtering unit 320 may detect a boundary line B between the water area and the shore area and additionally utilize it as area distinction information.

In addition, since a plurality of areas is used, dependency on the distinction between the shore area and the water area can be minimized. Accordingly, these methods may be considered in combination to improve device reliability.

Accordingly, the monitoring unit can monitor a change in water level through the above-described detection based on the boundary line B or detection of reference line intrusion.

In addition, a plurality of monitoring areas may be set in the setting unit 310 or at least one reference line may be set in the plurality of monitoring areas and variations generated in the plurality of monitoring areas or reference line intrusions may be detected and compared. If a difference in variation between the plurality of monitoring area is large, this may be recognized as noise. If the preset number of monitoring areas in the plurality of monitoring areas intrudes on a reference line, this may be recognized as transient abnormality, that is, noise.

Accordingly, as described above, the monitoring unit 330 can exclude noise in a spatial and temporal manner and may not output the warning signal for such noise.

Figure 10:
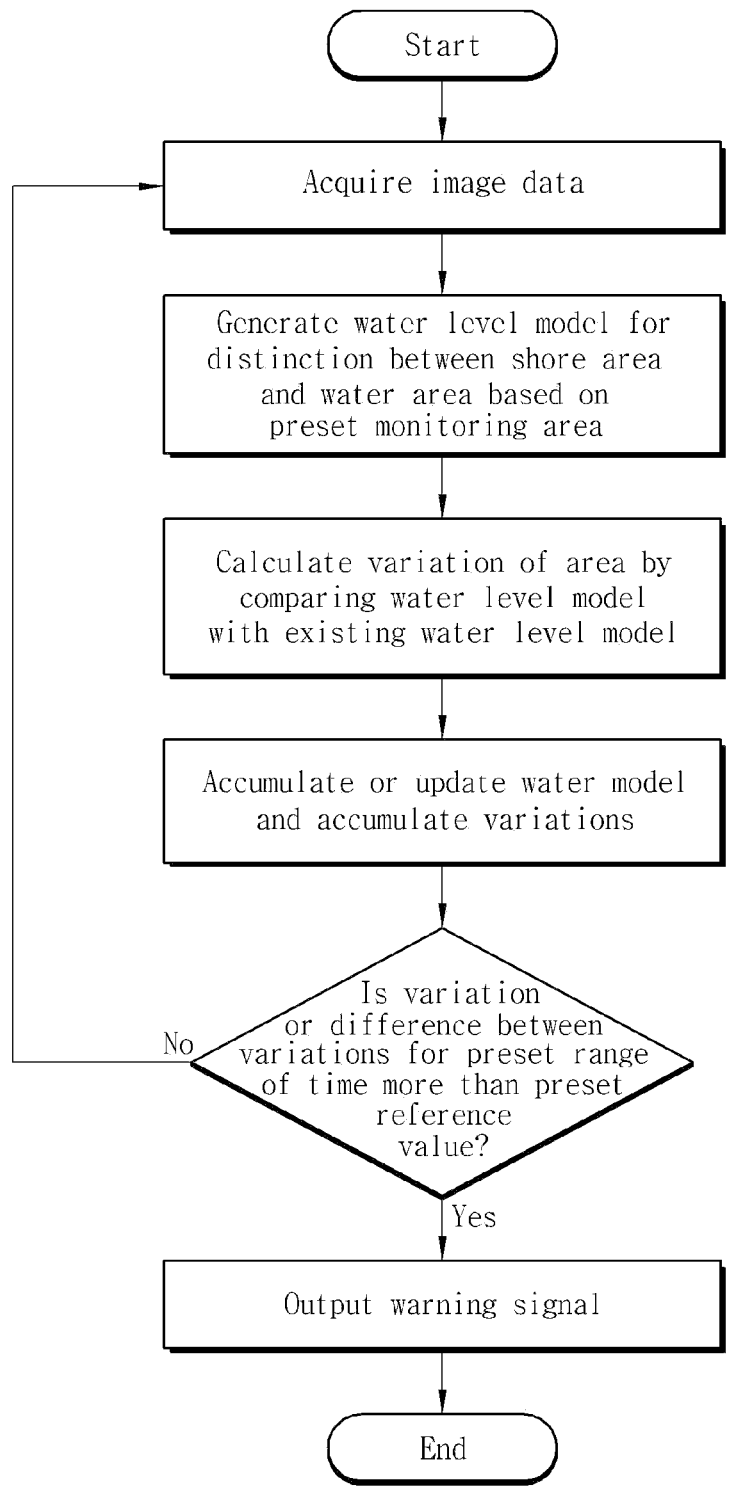
FIG. 10 is a flow chart showing a water level monitoring method of a water level monitoring device according to an embodiment of the present invention.

FIG. 10 is a flow chart of a water level monitoring method of the water level monitoring device according to the embodiment of the present invention. As shown, the water level monitoring device acquires image data including water and shore images from the camera unit and generates the water level model with distinction between the shore area and the water area based on the monitoring area preset in the image data.

Thereafter, the generated water level model may be compared with the existing water level model stored in the storage unit and a variation in pixels may be calculated for one of the water area and the shore area. In this case, the existing water level model stored in the storage unit may be updated with the generated water level model or the generated water level model may be accumulatively stored in the storage unit in a temporal sequence.

In addition, the variation in pixels may be also accumulatively stored in the storage unit in a temporal sequence. In this case, the variation generated by a difference in area with the existing water level model may have negative and positive values and may be added to or subtracted from the existing accumulated variation.

If the variation in pixels at a certain point of time exceeds a reference value or a difference between accumulated variations for a preset range of time before and after the certain point of time exceeds a preset reference value, this may be determined as abnormality of a change in water level and accordingly a warning signal may be output through the output unit.

While the present invention has been particularly shown and described with reference to exemplary embodiments thereof, it will be understood by those skilled in the art that various changes in form and details may be made therein without departing from the spirit and scope of the present invention. The exemplary embodiments are provided for the purpose of illustrating the invention, not in a limitative sense. Thus, it is intended that the present invention covers the modifications and variations of this invention provided they come within the scope of the appended claims and their equivalents.

What is claimed is:

1. A water level monitoring device which acquires image data including a monitoring area set to include a shore area and a water area and monitors a change in water level for the monitoring area, comprising:

a receiving unit which receives the image data from an external device;

an output unit which outputs a warning signal;

a storage unit which stores a water level model with distinction between the water area and the shore area as similar characteristic areas; and a controller which sets at least one monitoring area, generates the water level model for the monitoring area in the image data received from the receiving unit, updates the water level model stored in the storage unit or accumulates the water level model in the storage unit, monitors a water level based on a change in the shore area and the water area of the water level model, and outputs a warning signal through the output unit, wherein, if a plurality of monitoring areas is preset, the controller generates water level models for the plurality of monitoring areas, and, if it is detected that a variation in pixels exceeds a reference value preset for one of the water level models, determines whether or not a variation in pixels for another water level model exceeds a preset reference value, and determines whether or not to output a warning signal, and wherein, if a plurality of monitoring areas and reference lines for the plurality of monitoring areas are set, if one of the water area and the shore area intrudes on a reference line set in one of the water level models, the controller determines whether or not a reference line set in another water level model is intruded, and determines whether or not to output a warning signal.

2. The water level monitoring device according to claim 1, wherein the controller generates a water level model with distinction between the shore area and the water area by setting representative areas for the water area and the shore area, respectively, calculating a mean representative value for each of the representative areas, and grouping pixels having values falling within a preset approximation range of the mean representative value.

3. The water level monitoring device according to claim 1, wherein the controller generates the water level model with distinction between the shore area and the water area as similar characteristic areas through a Gaussian modeling.

4. The water level monitoring device according to claim 2, wherein the controller generates the water level model with distinction between the shore area and the water area by detecting a boundary line between the water area and the shore area.

5. The water level monitoring device according to claim 3, wherein the controller generates the water level model with distinction between the shore area and the water area by detecting a boundary line between the water area and the shore area.

6. The water level monitoring device according to claim 1, wherein the controller compares the existing water level model stored in the storage unit with the water level model generated based on the image data received from the receiving unit, and monitors a change in water level based on a variation in pixels calculated for one of the shore area and the water area.

7. The water level monitoring device according to claim 6, wherein the controller outputs a warning signal through the output unit if the variation in pixels exceeds a preset reference value or a temporally accumulated variation in pixels for a preset range of time exceeds a preset reference value.

8. The water level monitoring device according to claim 7, wherein the controller outputs no warning signal through the output unit if the variation in pixels exceeds a preset reference value and the temporally accumulated variation in pixels for a preset range of time is less than a preset reference value.

9. The water level monitoring device according to claim 1, wherein at least one reference line is set in the monitoring area, and
wherein the controller monitors whether or not one of the water area and the shore area in the water level model intrudes on the reference line, and outputs a warning signal through the output unit.

10. The water level monitoring device according to claim 9, wherein the storage unit stores a matching table in which water level values match the at least one reference line, and
wherein the controller calculates a water level value through monitoring whether or not the reference line is intruded based on the matching table, and outputs a warning signal through the output unit.

11. A water level monitoring method of a water level monitoring device which monitors a change in water level for a monitoring area including a shore area and a water area, comprising:

a first step of acquiring image data including the monitoring area from an external device;
a second step of generating a water level model by dividing an area corresponding to the monitoring area into the water area and the shore area as similar characteristic areas from the image data; and
a third step of monitoring a water level through comparison between the generated water level model and an existing water level model stored in a memory, outputting a warning signal through an output unit, and updating the existing water level model stored in the memory with the generated water level model or accumulating the generated water level model in the memory,
wherein, if a plurality of monitoring areas is preset,
a controller generates water level models for the plurality of monitoring areas, and, if it is detected that a variation in pixels exceeds a reference value preset for one of the water level models, determines whether or not a variation in pixels for another water level model exceeds a preset reference value, and determines whether or not to output a warning signal, and
wherein, if a plurality of monitoring areas and reference lines for the plurality of monitoring areas are set,
if one of the water area and the shore area intrudes on a reference line set in one of the water level models, the controller determines whether or not a reference line set in another water level model is intruded, and determines whether or not to output a warning signal.

12. The water level monitoring method according to claim 11, wherein the second step includes generating a water level model with distinction between the shore area and the water area by setting representative areas for the water area and the shore area, respectively, calculating a mean representative value for each of the representative areas, and grouping associated pixels, or through a Gaussian modeling.

13. The water level monitoring method according to claim 11, wherein the third step includes comparing the existing water level model with the generated water level model, monitoring a change in water level based on a variation in pixels calculated for one of the shore area and the water area, and outputting a warning signal through the output unit if the variation in pixels exceeds a preset reference value or a temporally accumulated variation in pixels for a preset range of time exceeds a preset reference value.

14. The water level monitoring method according to claim 13, wherein the third step includes outputting no warning signal through the output unit if the variation in pixels exceeds a preset reference value and the temporally accumulated variation in pixels for a preset range of time is less than a preset reference value.

15. The water level monitoring method according to claim 11, wherein at least one reference line is set in the monitoring area, and
wherein the third step includes monitoring whether or not one of the water area and the shore area in the water level model intrudes on the reference line, and outputting a warning signal through the output unit.

* * * * *